US010951075B2

(12) United States Patent
Woolmer

(10) Patent No.: US 10,951,075 B2
(45) Date of Patent: Mar. 16, 2021

(54) MACHINE COOLING SYSTEMS

(71) Applicant: YASA LIMITED, Yarnton (GB)

(72) Inventor: Tim Woolmer, Wheatley (GB)

(73) Assignee: YASA LIMITED, Oxford (GB)

( * ) Notice: Subject to any disclaimer, the term of this patent is extended or adjusted under 35 U.S.C. 154(b) by 158 days.

(21) Appl. No.: 15/119,478

(22) PCT Filed: Feb. 18, 2015

(86) PCT No.: PCT/GB2015/050465
§ 371 (c)(1),
(2) Date: Aug. 17, 2016

(87) PCT Pub. No.: WO2015/124922
PCT Pub. Date: Aug. 27, 2015

(65) Prior Publication Data
US 2017/0012480 A1 Jan. 12, 2017

(30) Foreign Application Priority Data

Feb. 18, 2014 (GB) ...................... 1402845

(51) Int. Cl.
*H02K 1/20* (2006.01)
*H02K 21/24* (2006.01)
(Continued)

(52) U.S. Cl.
CPC ................ *H02K 1/20* (2013.01); *H02K 1/12* (2013.01); *H02K 1/2793* (2013.01); *H02K 3/18* (2013.01);
(Continued)

(58) Field of Classification Search
CPC .......... H02K 3/24; H02K 9/005; H02K 15/04; H02K 15/0414; H02K 15/0435;
(Continued)

(56) References Cited

U.S. PATENT DOCUMENTS 4,714,576 A * 12/1987 Cotton ................ B29C 44/1242
264/262
2005/0029891 A1* 2/2005 Okada .................... H02K 3/522
310/194
(Continued)

FOREIGN PATENT DOCUMENTS

DE 4427323 2/1996
GB 626823 A * 7/1949 ............. H02K 3/527
(Continued)

OTHER PUBLICATIONS

Michioka (JP 2011188696 A) English Translation (Year: 2011).*
(Continued)

*Primary Examiner* — Tulsidas C Patel
*Assistant Examiner* — Robert E Mates
(74) *Attorney, Agent, or Firm* — Meunier Carlin & Curfman LLC

(57) ABSTRACT

We describe a method of cooling an axial flux permanent magnet machine, the machine having a stator comprising a stator housing enclosing a set of coils wound on respective stator bars and disposed circumferentially at intervals about an axis of the machine, and a rotor bearing a set of permanent magnets and mounted for rotation about said axis, and wherein said rotor and stator are spaced apart along said axis to define a gap therebetween in which magnetic flux in the machine is generally in an axial direction, the method comprising: flowing a coolant through said stator housing around said coils such that said coolant flows between said coils; and controlling said coolant flow between said coils by controlling a gap between adjacent said coils; wherein said controlling of said gap comprises: providing each of said coils with a single layer of windings over said stator bar, said layer of windings comprising a ribbon-shaped wire having a greater width across a surface of the ribbon than thickness through the ribbon; wherein said
(Continued)

windings are stacked horizontally along said stator bar such that adjacent ribbon surfaces of said ribbon abut one another, wherein said width of said ribbon defines a distance across a said coil perpendicular to a direction in which said windings are stacked; and controlling said gap by controlling said distance across said coil.

11 Claims, 6 Drawing Sheets

(51) Int. Cl.
      *H02K 1/27*        (2006.01)
      *H02K 3/18*        (2006.01)
      *H02K 3/24*        (2006.01)
      *H02K 9/19*        (2006.01)
      *H02K 1/12*        (2006.01)
      *H02K 15/02*      (2006.01)
      *H02K 9/00*        (2006.01)

(52) U.S. Cl.
      CPC ............... *H02K 3/24* (2013.01); *H02K 9/005* (2013.01); *H02K 9/19* (2013.01); *H02K 15/02* (2013.01); *H02K 21/24* (2013.01)

(58) Field of Classification Search
      CPC .......... H02K 1/20; H02K 1/12; H02K 1/2793; H02K 3/18; H02K 15/02; H02K 21/24; Y10T 29/49771
      See application file for complete search history.

(56) References Cited

U.S. PATENT DOCUMENTS

| | | | | |
|---|---|---|---|---|
| 2008/0183413 A1* | 7/2008 | Deshpande | ......... | G03F 7/70491 702/99 |
| 2010/0194251 A1* | 8/2010 | Sikes | ...................... | F03D 3/065 310/68 D |
| 2010/0238425 A1* | 9/2010 | Binnard | ................. | G03B 27/58 355/72 |
| 2011/0309699 A1* | 12/2011 | Woolmer | ................. | H02K 1/30 310/58 |
| 2012/0062154 A1* | 3/2012 | Chiao | ...................... | H02K 3/47 318/161 |
| 2012/0092117 A1* | 4/2012 | Urano | ...................... | H02K 3/42 336/186 |
| 2012/0319458 A1* | 12/2012 | Ozaki | .................. | B60K 7/0007 301/6.5 |
| 2012/0319507 A1* | 12/2012 | Ueno | ..................... | H02K 3/325 310/43 |
| 2012/0319523 A1* | 12/2012 | Manabu | ............. | H02K 15/0464 310/201 |
| 2013/0062972 A1* | 3/2013 | Sato | ......................... | H02K 3/24 310/43 |
| 2013/0147291 A1* | 6/2013 | Woolmer | ................. | H02K 1/14 310/58 |

FOREIGN PATENT DOCUMENTS

| | | | | |
|---|---|---|---|---|
| GB | 2468018 | | 8/2010 | |
| JP | 2005019618 A | * | 1/2005 | |
| JP | 2005237086 | | 9/2005 | |
| JP | 200774881 | | 3/2007 | |
| JP | 2011188696 | | 9/2011 | |
| JP | 2011188696 A | * | 9/2011 | |
| JP | 2011259566 A | | 12/2011 | |
| JP | 2013110794 | | 6/2013 | |
| WO | WO-2012022974 A1 | * | 2/2012 | ............... H02K 1/14 |
| WO | WO-2012091601 A1 | * | 7/2012 | ............... H02K 3/24 |

OTHER PUBLICATIONS

Royama (JP 2005019618 A) English Translation (Year: 2005)*
International Search Report and Written Opinion conducted in International Application PCT/GB2015/050465, dated Apr. 28, 2015.
Chinese Office Action issued in CN Application No. 2015800093259, dated Apr. 3, 2018.
Official Notice of Rejection issued in Japanese Patent Application No. 2016-552571, dated Sep. 11, 2018.
English Translation of Japanese Office Action, in connection with Japanese Application No. 2016-552571. dated Jul. 8, 2019.

* cited by examiner

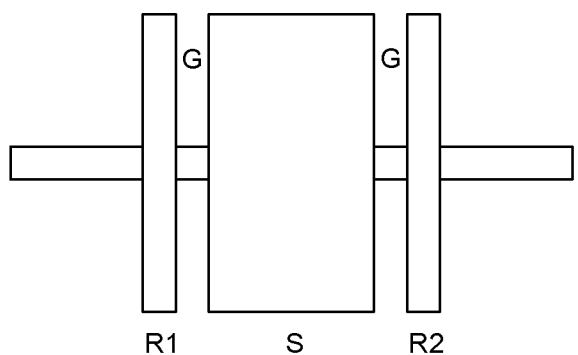
Figure 1a
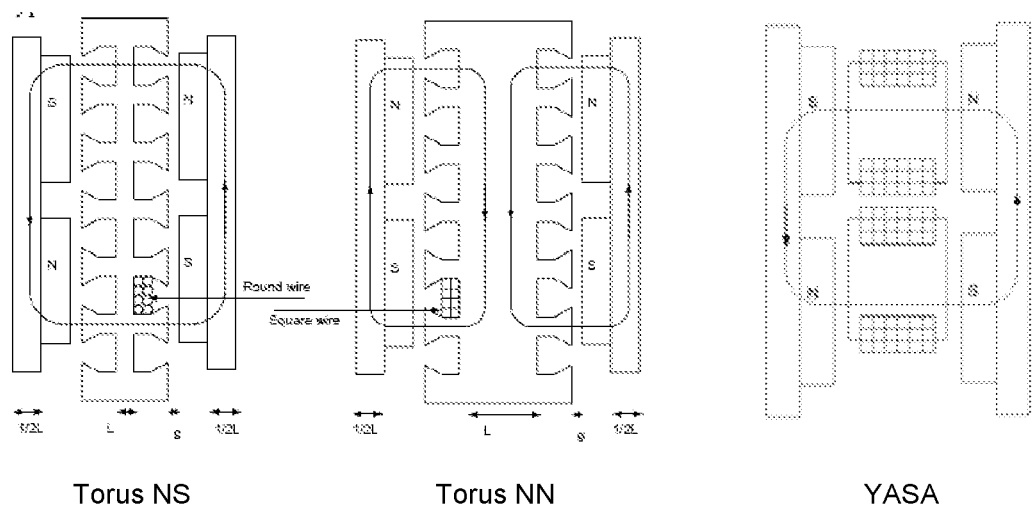
Torus NS          Torus NN          YASA

MACHINE COOLING SYSTEMS

CROSS-REFERENCE TO RELATED APPLICATIONS

This application is a national stage application filed under 35 U.S.C. § 371 of PCT/GB2015/050465 filed Feb. 18, 2015, which claims the benefit of and priority to U.K. Patent Application No. 1402845.0 filed on Feb. 18, 2014, the disclosures of which are expressly incorporated herein by reference in their entirety.

FIELD OF THE INVENTION

This invention relates to improved techniques for cooling an axial flux permanent magnet machine, and to machines employing these techniques.

BACKGROUND TO THE INVENTION

In this specification we are concerned with axial flux permanent magnet machines.

Broadly speaking these have disc- or ring-shaped rotor and stator structures arranged about an axis. Typically the stator comprises a set of coils each parallel to the axis and the rotor bears a set of permanent magnets and is mounted on a bearing so that it can rotate about the axis driven by fields from the stator coils. FIG. 1a shows the general configuration of an axial flux machine with a pair of rotors R1, R2 to either side of a stator S—although a simple structure could omit one of the rotors. As can be seen there is an air gap G between a rotor and a stator and in an axial flux machine the direction of flux through the air gap is substantially axial.

There are various configurations of axial flux permanent magnet machine depending upon the arrangement of north and south poles on the rotors. FIG. 1b illustrates the basic configurations of a Torus NS machine, a Torus NN machine (which has a thicker yoke because the NN pole arrangement requires flux to flow through the thickness of the yoke), and a YASA (Yokeless and Segmented Armature) topology. The illustration of the YASA topology shows cross-sections through two coils, the cross-hatched area showing the windings around each coil. As can be appreciated, dispensing with the stator yoke provides a substantial saving in weight and iron losses, but one drawback is loss of a route for heat to escape from stator coils. Thus preferably coolant for the machine is circulated through the stator housing.

We have previously described, in WO2012/022974, a clamshell type stator housing. Advantageously shoes of the stator bars on which the stator coils are wound are over-moulded into the radial wall of the housing. Thus the housing provides both structural strength and a coolant chamber.

Referring first to FIGS. 1c, 2 and 3, which are taken from our PCT application WO2012/022974, FIG. 1c shows a schematic illustration of a yokeless and segmented armature machine 10. The machine 10 comprises a stator 12 and two rotors 14a,b. The stator 12 is a collection of separate stator bars 16 spaced circumferentially about a rotation axis 20 of the rotors 14a,b. Each bar 16 has its own axis (not shown) which is preferably, but not essentially, disposed parallel to the rotation axis 20. Each end of each stator bar is provided with a shoe 18a,b which serves a physical purpose of confining a coil stack 22, which stack 22 is preferably of square/rectangular section insulated wire so that a high fill factor can be achieved. The coils 22 are connected to an electrical circuit (not shown) that, in the case of a motor, energizes the coils so that the poles of the resultant magnetic fields generated by the current flowing in the coils is opposite in adjacent stator coils 22.

The two rotors 14a,b carry permanent magnets 24a,b that face one another with the stator coil 22 between (when the stator bars are inclined—not as shown—the magnets are likewise). Two air gaps 26a,b are disposed between respective shoe and magnet pairs 18a/24a, 18b/24b. There is an even number of coils and magnets spaced around the axis of rotation 20 and, preferably, there are different numbers of coils and magnets so that the coils do not all come into registration with the corresponding magnet pair at the same time and at the same rotational position of the rotor with respect to the stator. This serves to reduce cogging.

In a motor the coils 22 are energized so that their polarity alternates serving to cause coils at different times to align with different magnet pairs, resulting in torque being applied between the rotor and the stator. The rotors 14a,b are generally connected together (for example by a shaft, not shown) and rotate together about the axis 20 relative to the stator 12. The magnetic circuit 30 is provided by two adjacent stator bars 16 and two magnet pairs 24a,b and a back iron 32a,b for each rotor links the flux between the back of each magnet 24a,b facing away from the respective coils 22. The stator coils 16 are enclosed within a housing that extends through the air gap 26a,b and which defines a chamber supplied with a cooling medium.

Turning to FIG. 3, a stator 12a is shown in which the stator coils are located between plastics material clam shells 42a,b These clamshells have external cylindrical walls 44, internal cylindrical walls 46, and annular radially disposed walls 48. In the prior art example of FIG. 3 the radial walls 48 include internal pockets 50 to receive the shoes 18a,b of the stator bars 16 and serve to locate the stator coil assemblies 16, 22, 18a,b when the two clam shell housings 42a,b of the stator 12a are assembled together. The stator housing 42a,b defines spaces 52 internally of the coils 22 and externally at 54 around the outside of the coils 22 and there are spaces 56 between the coils. The spaces 52,54,56 are interlinked defining a cooling chamber. Although not shown in FIG. 3, when assembled, the stator housing 42a,b is provided with ports that allow cooling medium such as oil to be pumped into the spaces 52,54,56 to circulate around the coils and cool them. In operation the spaces around the coils within the chamber are preferably substantially completely filled with coolant; that is preferably the chamber is substantially completely full of coolant (oil).

Achieving cooling is a major problem in an axial flux permanent magnet machine, for example motor, in part because of the very high power densities of which these machines are capable. In practice the speed at which heat can be removed from a motor is often the most important limiting factor on the torque which can be achieved, at least when running a motor continuously for extended periods of time.

We have previously described some techniques for improved cooling of an axial flux motor in GB2,468,018A. In addition, general background prior art can be found in GB2,482,928A; JP2009/142095A; US2010/0141373; US2010/180977; US2010/000624; JP2006/288025A; JP2002/184639A; GB2,741,135A; JP2009/225507A; U.S. Pat. No. 4,446,393; JP2006/014530; JP2011/091920; U.S. Pat. No. 6,555,942 and GB1,519,813A.

Our earlier patent application GB2,468,018A describes cooling techniques in which coolant, typically oil, is forced through the gaps between adjacent stator coils as it circulates through the stator housing. This is achieved in a ring-shaped housing by providing inlet and outlet ports close or adjacent to one another, with an internal barrier to block a direct path between the ports so that the coolant is forced to circulate around the ring. In addition barriers are disposed at intervals around the ring between the coils and radially inner and outer walls of the ring-shaped housing to define a serpentine path for the coolant: broadly speaking the coolant travels around the outer edge of the ring until it meets a barrier whereupon it is forced between the coils towards an inner wall of the ring, where it travels along the inner wall until it meets a further barrier and is forced outwards towards the outer wall, again between the coils. More particularly, however, the barriers between the stator coils and inner and outer housing walls are not, in embodiments, provided alternately from one coil to the next but instead inner (and outer) barriers are provided every n coils where n≥2. Consequently, in embodiments, two or more radially inward paths between the coils are provided in parallel followed by two or more radially outward paths between the coils in parallel, and so forth. In embodiments the coolant oil substantially fills all the free volume of the stator housing, that is the volume not occupied by other components of the stator and is preferably substantially free of air (the air may be bled out or the chamber filled under vacuum).

To maximise the power available from a motor of a given volume, in theory as much of the volume of the stator as possible should be occupied by the stator coils. However to be able to sustain high power output operation the machine also needs effective cooling and the coolant needs to be able to flow around and, in particular, between the stator coils. It is generally desirable to keep the gaps between the adjacent coils small whilst still ensuring adequate flow between the coils and in practice tolerance stacking within the stator assembly has a very surprisingly large effect on the maximum power at which the motor can be operated for an extended period. When the gaps are small, small absolute changes in gap width can give rise to large percentage changes in width, especially as the hydrodynamic width may be less than the physical width due to the boundary layer on the sides of the coils. Nonetheless, apart from the desire to maximise the volume of magnetic material in this data it is also desirable to employ small gaps because these tend to promote turbulence because of the relatively larger Reynolds number of a small gap. Small changes in a small gap width can have a substantial effect on the flow of coolant between stator coils and this in turn can translate to an even larger effect on the relative efficiency with which different coils are cooled, and this in turn can determine a limit of safe operation for the machine as a whole. This is especially a problem where, as described above, there are parallel coolant flow paths between adjacent pairs of stator coils: in this situation the coolant will flow disproportionately through the widest channel, and the least well cooled coil will tend to define an operational limit for the machine as a whole.

It is therefore generally desirable to be able to more accurately define the coolant flow between adjacent stator coils of an axial flux permanent magnet machine of the type described.

SUMMARY OF THE INVENTION

According to a first aspect of the invention there is therefore provided a method of cooling an axial flux permanent magnet machine, the machine having a stator comprising a stator housing enclosing a set of coils wound on respective stator bars and disposed circumferentially at intervals about an axis of the machine, and a rotor bearing a set of permanent magnets and mounted for rotation about said axis, and wherein said rotor and stator are spaced apart along said axis to define a gap therebetween in which magnetic flux in the machine is generally in an axial direction, the method comprising: flowing a coolant through said stator housing around said coils such that said coolant flows between said coils; and controlling said coolant flow between said coils by controlling a gap between adjacent said coils; wherein said controlling of said gap comprises: providing each of said coils with a single layer of windings over said stator bar, said layer of windings comprising a ribbon-shaped wire having a greater width across a surface of the ribbon than thickness through the ribbon; wherein said windings are stacked horizontally along said stator bar such that adjacent ribbon surfaces of said ribbon abut one another, wherein said width of said ribbon defines a distance across a said coil perpendicular to a direction in which said windings are stacked; and controlling said gap by controlling said distance across said coil.

In embodiments using an edge-wound coil with a single layer of windings of a ribbon-shaped wire, typically copper provides a suitable current-carrying capability whilst reducing the number of interfaces between the stator bar and the outer edge of the stator coil. With multiple turns of round or square-section wire there are multiple interfaces between the stator bar and the edge of a coil and tolerance stacking across these results in a variation in the total distance across a stator coil causing a significant variation in the gap between adjacent coils. By contrast, using an edge-wound coil comprising just a single layer of windings allows the distance across a stator coil and hence the gap between coils, to be controlled much more accurately, thus enabling much more accurate control of the coolant flow between the stator coils.

In embodiments the gap is controlled to within a tolerance limit percentage variation from an average gap width between the coils by using the single layer of windings of the ribbon-shaped wire to limit variation in locations of outer edges of the coils of the stator. For example in embodiments the minimum gap between adjacent coils may be less than 2 mm, for example in the range 1 mm to 2 mm, and this may be controlled to within a tolerance limit of +/−20% or +/−10%.

In some preferred embodiments the coolant is constrained to flow back and forth between inner and outer walls of the stator housing through the gaps between the coils, in particular by blocks or barriers located at intervals between the coils and the inner and outer walls of the housing. More particularly in embodiments the coolant flow is arranged such that two or more radial coolant flow paths (between the coils) in one radial direction, say inwards, are followed by two or more parallel paths in the opposite radial direction say outwards (here 'parallel' refers to the nature of the flow rather than specifically to geometric parallelism). Such an arrangement can be achieved, for example, by providing blocks or barriers alternately between coils and respective inner and outer radial walls at intervals of n coils where n≥2 in such an arrangement. In such an arrangement it becomes especially important to balance or equalises the coolant flow between adjacent pairs of coils and using an edge-wound coil provides much more accurate control of tolerances within the stator assembly which enables improved flow balancing/equalisation to be achieved.

In preferred embodiments a stator coil comprises a pole piece or stator bar around which the coil is wound with a pole shoe at either end to spread the field where it crosses the air gap to the rotor, the increased area reducing the overall reluctance of the gap. To reduce eddy currents the stator bar and/or shoe may be laminated or formed from soft magnetic composite (SMC)—soft iron particles coated with electrical insulation and moulded to a desired shape. Nonetheless, although eddy currents can be substantially reduced, surprisingly hysteresis losses, particularly in the pole shoes, are responsible for a substantial fraction of the overall heating of a stator coil. It is therefore desirable to be able to improve cooling of the stator coil shoes and, in embodiments, this may be achieved by stopping the windings on the stator bar short of one or both shoes to define a coolant channel between an end of the coil and a respective shoe. This may be achieved, for example by a spacer between the coil and respective shoe and all by providing a bobbin for the coil which can then be mounted on the stator bar so as to stand the coil off from one or both shoes. However it is not essential to use either a spacer or a bobbin. In particular it can be advantageous if the edge wound coil is preloaded in (slight) compression to urge the turns of the coil towards one another absent external applied force. In this way the coil holds itself together as a single quasi-solid unit, facilitating fabrication of the stator coils and more particularly facilitating provision of a gap between the end of a stator coil and a pole shoe. The skilled person will appreciate, however, that a preloaded coil of this type is useful in manufacture of a stator even where no such shoe cooling arrangement is employed. Furthermore, in general the length of an edge wound coil is less well toleranced than the width across the ribbon, and preloading of this type can help to improve the tolerance in the coil length, albeit this is less critical than the gap-defining coil width.

In a related aspect the invention provides a method of manufacturing an axial flux permanent magnet machine, the machine having a stator comprising a stator housing enclosing a set of coils wound on respective stator bars and disposed circumferentially at intervals about an axis of the machine, and a rotor bearing a set of permanent magnets and mounted for rotation about said axis, and wherein said rotor and stator are spaced apart along said axis to define a gap therebetween in which magnetic flux in the machine is generally in an axial direction, the method comprising: providing ports for flowing coolant through said stator housing around said coils such that said coolant flows between said coils; and defining a gap for coolant flow between adjacent said coils by providing each of said coils with a single layer of windings over said stator bar, said layer of windings comprising a ribbon-shaped wire having a greater width across a surface of the ribbon than thickness through the ribbon; wherein said windings are stacked horizontally along said stator bar such that adjacent ribbon surfaces of said ribbon abut one another, wherein said width of said ribbon defines a distance across a said coil perpendicular to a direction in which said windings are stacked.

In a further related aspect the invention provides an axial flux permanent magnetic machine, the machine having a stator comprising: a stator housing enclosing a set of coils wound on respective stator bars and disposed circumferentially at intervals about an axis of the machine, and a rotor bearing a set of permanent magnets and mounted for rotation about said axis, and wherein said rotor and stator are spaced apart along said axis to define a gap therebetween in which magnetic flux in the machine is generally in an axial direction; and wherein each of said coils has a single layer of windings over said stator bar, said layer of windings comprising a ribbon-shaped wire having a greater width across a surface of the ribbon than thickness through the ribbon; wherein said windings are stacked horizontally along said stator bar such that adjacent ribbon surfaces of said ribbon abut one another, wherein said width of said ribbon defines a distance across a said coil perpendicular to a direction in which said windings are stacked.

BRIEF DESCRIPTION OF THE DRAWINGS

These and other aspects of the invention will now be further described, by way of example only, with reference to the accompanying figures in which:

FIGS. 1a to 1c show, respectively, a general configuration of a two-rotor axial flux machine, example topologies for axial flux permanent magnet machines, and a schematic side view of a yokeless and segmented armature (YASA) machine;

DETAILED DESCRIPTION OF PREFERRED EMBODIMENTS

Figure 4A:
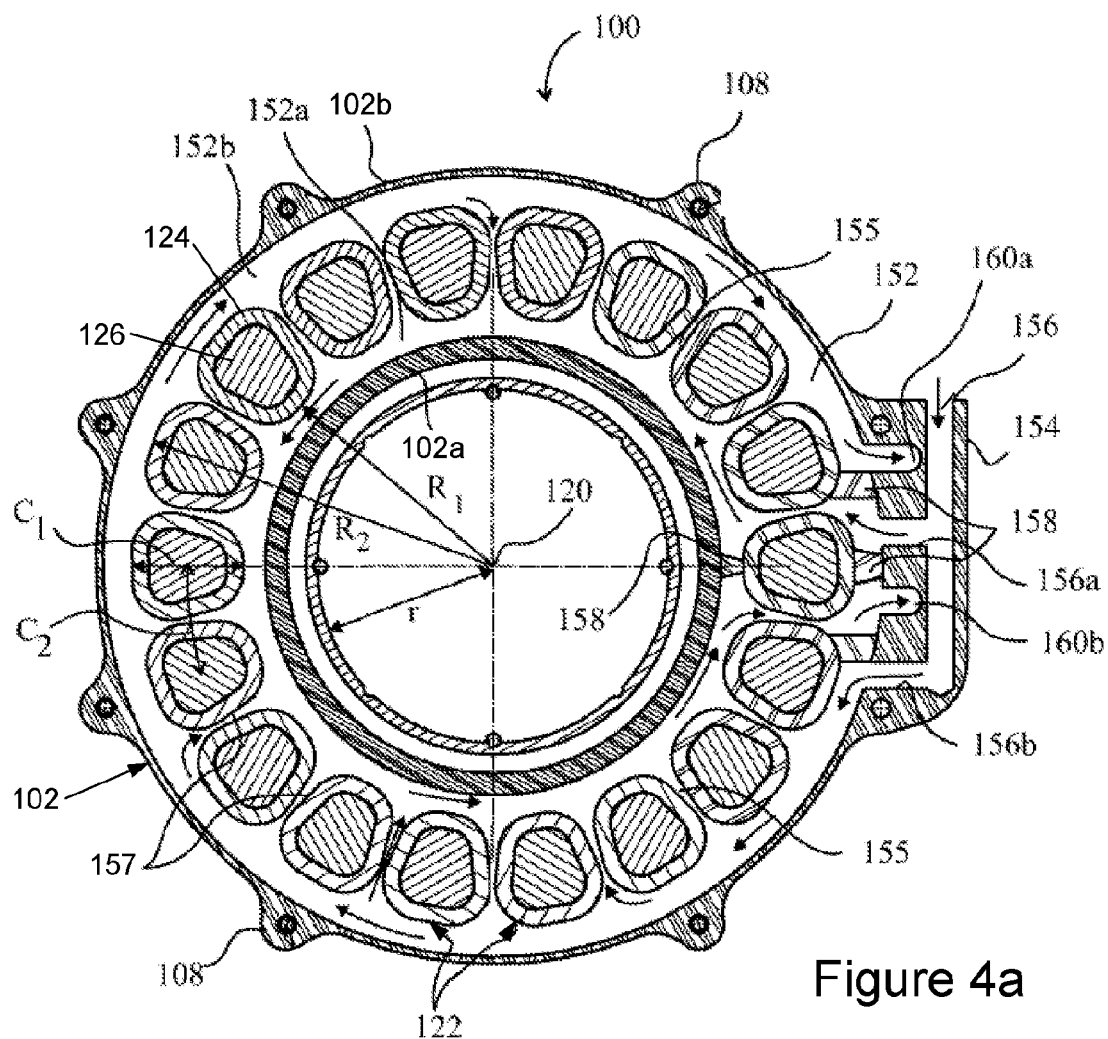
FIGS. 4a and 4b show cross-sections through the stator of an axial flux motor illustrating alternative arrangements for coolant flow within the stator housing.
Figure 4B:
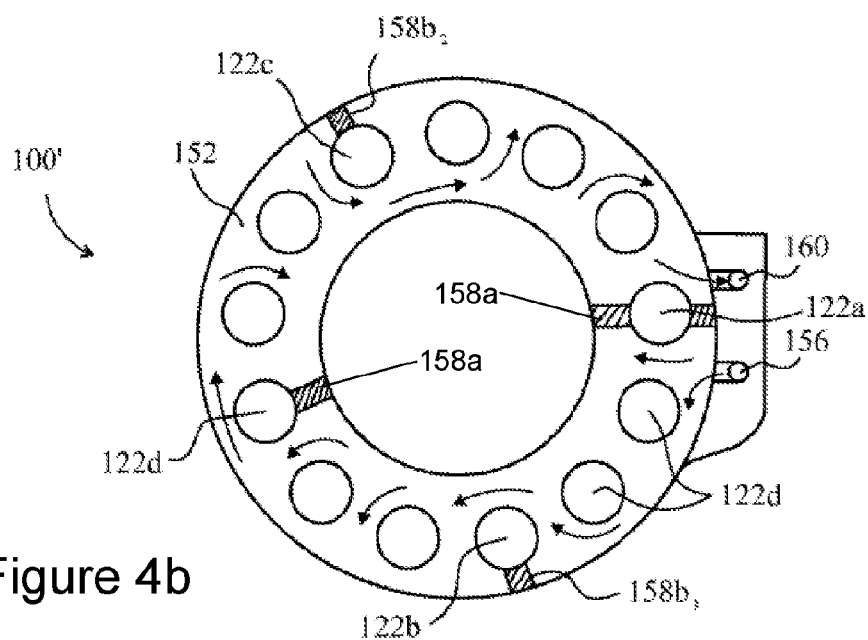

Referring now to FIGS. 4a and 4b, which are taken from GB2,468,018A, these illustrate example cooling arrangements for an axial flux motor. Thus FIG. 4a shows the interior of an axial flux motor stator 100 comprising a housing 102 having inner 102a and outer 102b radial walls, the housing enclosing a plurality of stator coils 122. The coils are shown in cross-section, each comprising a winding 124 around a stator bar core 126. In the illustrated example of FIG. 4a the housing has a plurality of bosses 108 to allow multiple motors each comprising at least a stator and a rotor to be bolted together to provide power to a common drive output.

An inlet port 154 provides an inlet 156 for coolant, the inlet branching into two parts 156a,b through which coolant enters chamber 152 within the housing. The coolant exits chamber 152 via outlets 160a,b of an outlet port 160 (not shown in the Figure). Barriers 158 are provided between the inlets and outlets and, in the illustrated example, coolant circulates in opposite directions adjacent the inner and outer walls of the chamber and thus also flows through the gaps 155 between the coils. As can be seen, in embodiments the coils are generally wedge-shaped leaving a coolant passage between the outer surfaces 157 of adjacent coils, defined by the outer turns of the coils. As illustrated, the turns of wire around the stator bars tend to define a passage which is flared; the flow between the coils tends to be governed by the narrowest part of the gap 155 between adjacent pairs of coils.

Referring to FIG. 4b, this shows a simplified schematic diagram of an alternative version of an axial flux motor stator 100'. In the arrangement of FIG. 4b a plurality of blocks or barriers 158a,b is provided, barriers 158a connecting a coil with the inner wall of the stator housing chamber, barriers 158b connecting stator coils with an outer wall of the housing. As can be seen from FIG. 4b, a barrier 158b to the outer wall forces the coolant between adjacent coils towards the inner wall, and vice versa.

In more detail, a pair of blocks/barriers is provided connecting coil 122a to both the inner and outer walls of the housing, to provide a barrier between the inlet 156 and outlet 160. Blocks/barriers 158b are periodically disposed around the machine firstly 158b1 and lastly 158b2 on the outside of coils 122b,c and at least one further block/barrier 158a is provided between coil 122d and the inner housing wall. By this arrangement the flow enters inlet 156 and begins around the outside of the machine but is directed by block/barrier 158b1 to transition to the inside of chamber 152, between different ones of intervening coils 122d. From there, flow continues circulation around the machine but is forced by block 158a to transition back to the outside of the chamber. Further around the machine block 158b2 obliges transition back to the inside and finally, in order to exit the machine through outlet 160, another block 158a forces transition a final time back to the outside. As illustrated in FIG. 4b there are four transitions but any even number of transitions is possible, or an odd number if the inlet and outlet are arranged one on the outside of the machine and the other on the inside.

In the illustrated embodiment of FIG. 4b it will be appreciated that there are multiple coolant flows in parallel between adjacent stator coils—in the illustrated example there are three parallel outer-to-inner coolant flows between the coils and then three inner-to-outer coolant flows, and so forth.

Experimental work including thermal imaging, modelling and the like has shown that although this type of cooling is very effective there are practical problems especially when, as desirable in practice, gaps between adjacent coils are small: Tolerances within the stator can cause variations in the actual size of gap between the coils (which is theoretically the same for each pair of adjacent coils). Especially when the gap is small this can cause a significant percentage variation in gap minimum dimension. This in turn affects the effectiveness of cooling of the stator coils, moreover to a larger degree than expected because of the effect of the boundary layer of coolant on the outer surface of a coil. The result is that surprisingly small differences in gap due to tolerances within the stator assembly can result in significant differences in coolant flow between the coils and hence significant differences in the degree to which different coils are cooled. Furthermore the operational constraint or limit of damage for the motor is determined by the 'weakest link', that is by the least effectively cooled coil. The result is that tolerances within the stator assembly, especially where the gaps between adjacent stator coils are small, can have a disproportionate effect on the overall safe power output/torque from the motor.

Figure 1C:
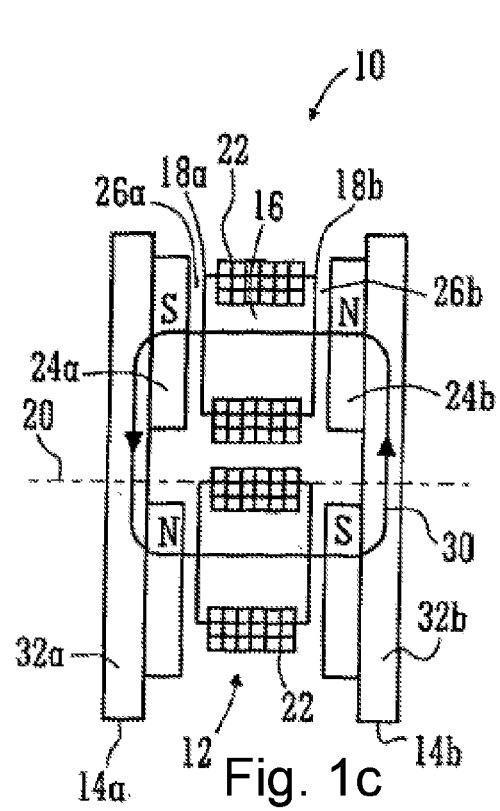
Figure 2:
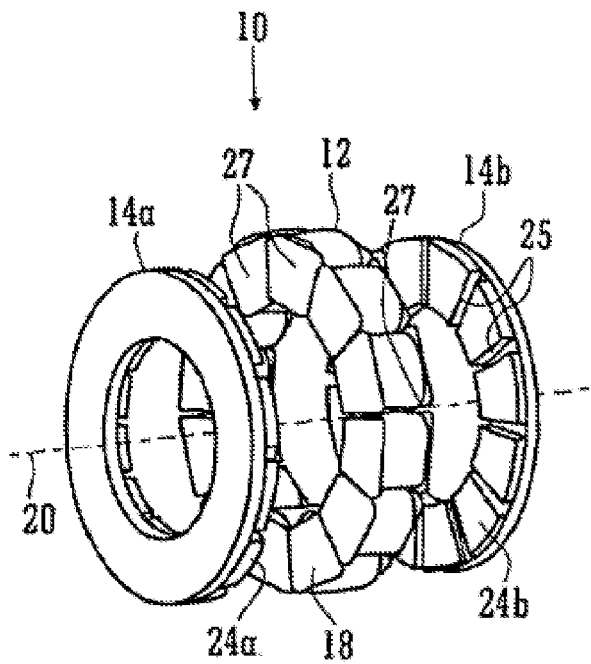
FIG. 2 shows a perspective view of the YASA machine of FIG. 1c.
Figure 3:
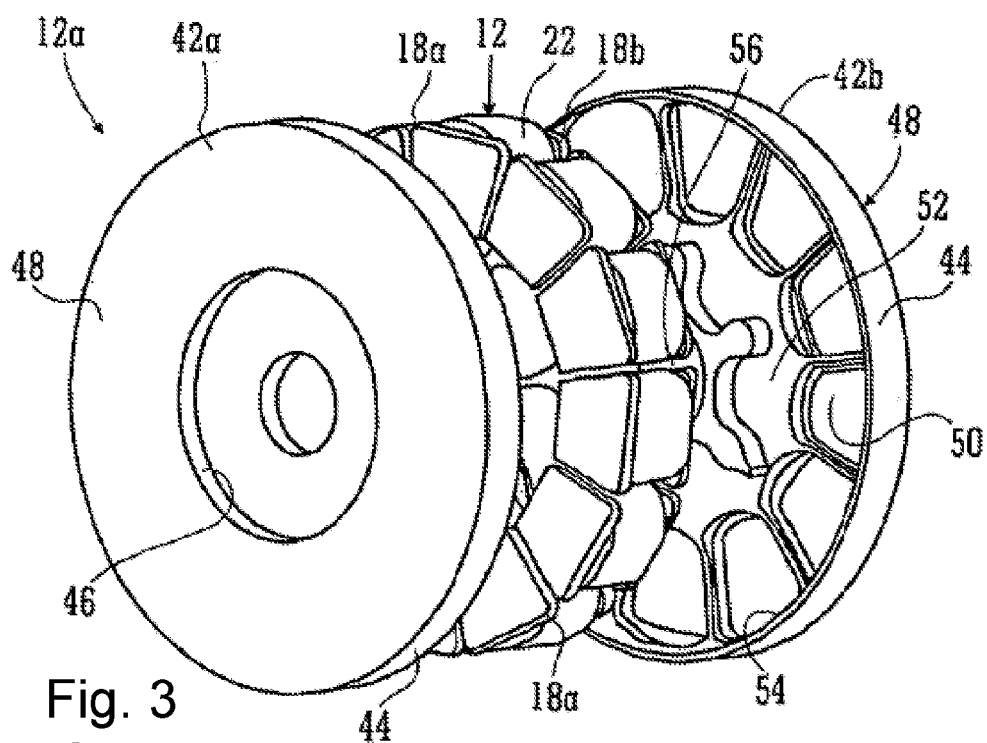
FIG. 3 shows a perspective exploded view of a stator and stator housing for a YASA machine according to the prior art.
Figure 5A:
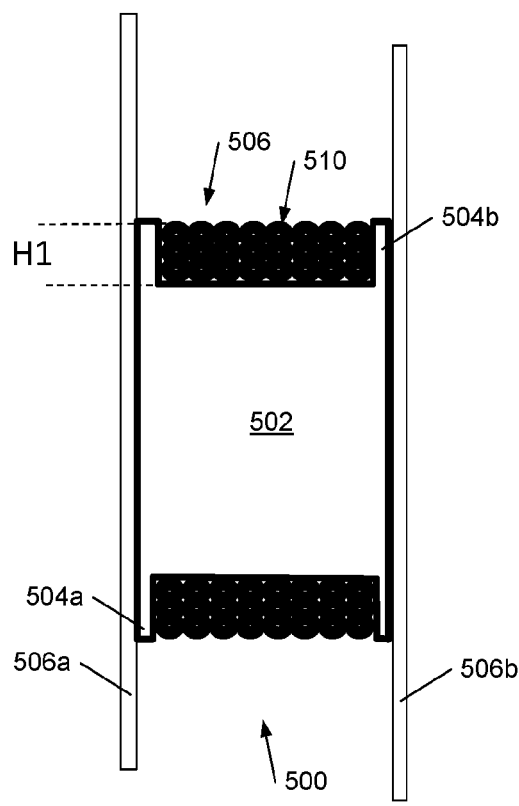
FIGS. 5a to 5c show, respectively, a conventionally wound stator coil, a stator coil of an axial flux motor employing an edge-wound coil, and a perspective view of a set of windings of an edge wound coil suitable for use in the arrangement of FIG. 5b.

Referring now to FIG. 5a, this shows a cross-sectional view through a stator coil 500 comprising a stator bar 502 at each end of which is provided a respective shoe 504a,b, extending beyond the dimensions of the stator bar to provide an increased area magnetic path. A plurality of turns of wire 506 is wound around the stator bar 502, and the coil is located between front and rear housing walls 506a,b (walls 48 in FIG. 3).

It can be appreciated that the minimum width of gap 155 in FIG. 4a is determined by the dimensions of the stator bar 502 and of the coil wound over the stator bar defining an outer face 510 of the coil. Various factors can contribute to variations in the distance across a stator coil between faces 510 including the tolerance of the conductive metal part of the wire and the tolerance of the insulating coating over the wire—typically there can be multiple layers of insulating coating, for example a layer of polyimide followed by a layer of polyamide. In the example illustrated in FIG. 5a there are three layers of windings on the stator bar core and thus the tolerance of the wire is multiplied by 3 and that of the coating thickness is multiplied by 6 (two coating widths per side of the wire thickness). In addition the wire itself has a degree of springiness (if completely soft it will stretch during winding) and thus the turns do not lie flat on the stator bar core, especially around the corners (see view from above of FIG. 4a). All these contributions sum to give a significant variation in distance across a stator coil between outer faces 510 of the coil; this variation can amount to a few hundred micrometres. The gap 155 in FIG. 4a, between adjacent coils, in particular the minimum gap, is determined by the distance across a stator coil between faces 510. Typically, but not necessarily, the gap between coils is governed by the maximum distance across the coil in a circumferential direction (see FIG. 4a). The target gap for any particular machine is governed by a number of factors including, for example, oil throughput (in embodiments of order 6 litres per minute), the size of the pole pieces (stator bars), the temperature of operation, the degree of turbulence it is desired to achieve in the coolant flow, and the like. However, broadly speaking it is desirable to maximise the amount of iron in the motor and thus it is preferable for the gap to be in the range 0.25 mm to 3 mm, more often in the range 0.5 mm to 2 mm, for example around 1.5 mm. This results in a pressure differential of perhaps 0.05-0.2 bar for a 6 litres per minute coolant flow in one embodiment. It can be appreciated that with such a narrow gap a tolerance of perhaps 200 µm can have a significant effect on coolant flow between coils, especially as there are additional variations to take into account such as the tolerance associated with placement of the pole pieces on the end walls 506 of the housing. If, say, one gap is 1 mm and an adjacent gap is 0.75 mm then one coil or part of a coil may be much less effectively cooled than another, especially where, as in FIG. 4b, there are parallel flow paths which the coolant is able to take.

Figure 5B:
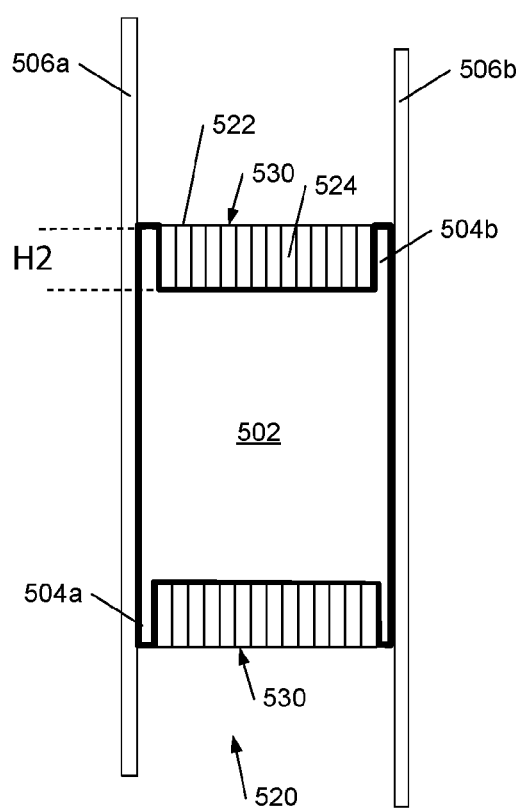
Figure 5C:
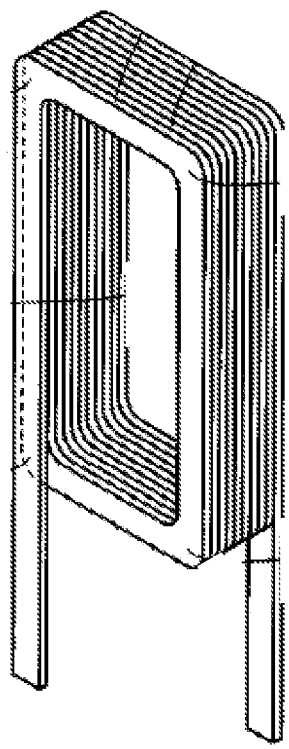

FIG. 5b shows an embodiment of a stator coil 520 with a plurality of edge-wound windings 522 of ribbon shaped wire 524 in a single layer over stator bar 502. FIG. 5c shows the single layer of windings 522 in perspective view without the iron parts, for clarity. It can be appreciated that the (maximum circumferential) distance across faces 530 of the stator coil are defined by the width w, of the wire ribbon 524. By comparison with the arrangement of FIG. 5a the distance between faces 530 is determined by just one dimension, w, for the metal of the wire rather than by three, and by the thickness of two layers of coating rather than six. Furthermore the manufacturing process for square or rounded wire tends to result in an imprecise definition of the wire diameter. By contrast special manufacturing techniques are needed to fabricate an edge-wound coil such as that shown in FIG. 5c and the nature of the process tends to result in more accurate tolerancing, for example to a few tens of micrometres. In percentage terms for a (minimum) gap in the range 1-2 mm the tolerance as a percentage of the gap can be reduced from around 50% down to around 10%.

Figure 6:
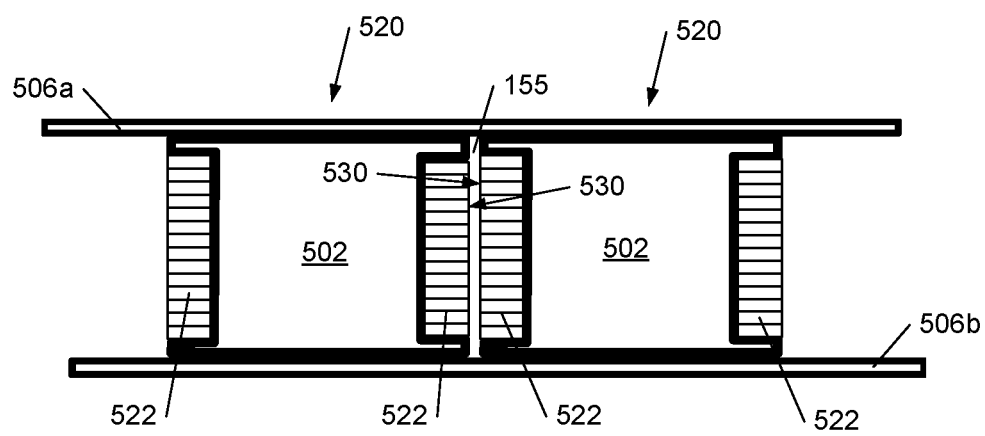
FIG. 6 shows a side view of gaps between adjacent stator coils illustrating definition of a coolant channel through the gap by the outer surfaces of adjacent edge-wound coils.

FIG. 6 shows a view of a pair of stator coils 520 of the type illustrated in FIG. 5b showing the gap 155 between the outer faces 530 of the windings from the side.

Surprisingly use of an edge-wound coil as described can result in a motor which is able to deliver tens of kilowatts more power.

Figure 7A:
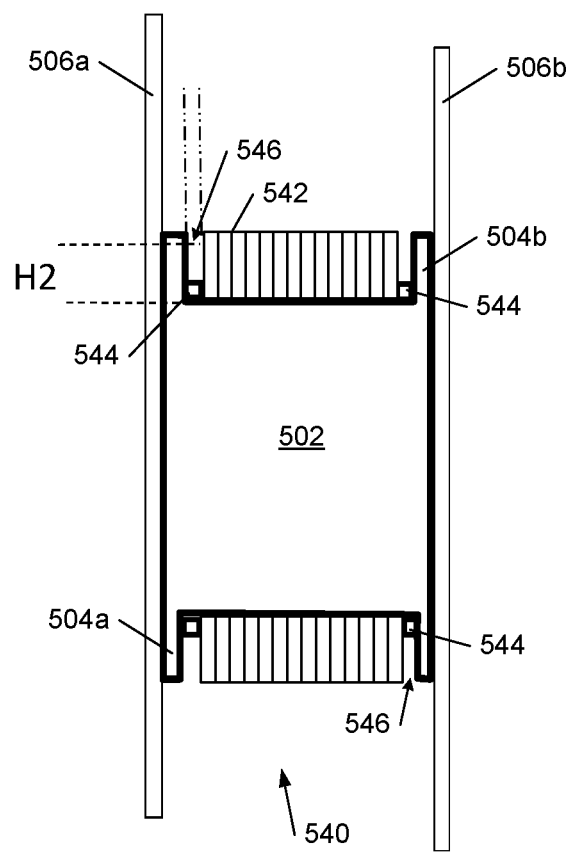
FIGS. 7a and 7b show examples of stator coils with gaps between the ends of the windings and the pole shoes illustrating respectively a single coil and an I-shaped coolant flow path between adjacent coils.
Figure 7B:
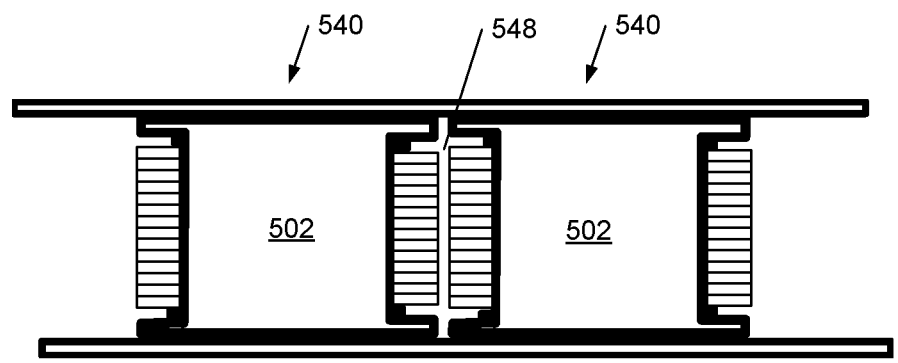

FIGS. 7a and 7b show stator coils 540 similar to coil 520 of FIG. 5b, but in which the windings 542 stop short of the shoes 504 at either end of the stator bar. This leaves a channel 546 between the ends of the windings 542 and each shoe 504a,b. In embodiments a spacer 544 may be used to hold the windings 542 in place between the shoes, but this is optional. In some alternative arrangements a bobbin (not shown) may be employed to hold the windings; or the windings may be held in place by glue or the like.

FIG. 7b illustrates the I-shaped channel cross-section 548 between adjacent coils which results. This helps to provide efficient cooling of the shoes 504a,b, which are heated by hysteresis.

When designing an axial flux motor of the type described there are various approaches which may be taken. For example the design procedure may begin by defining a target torque, which in turn leads to specifying a number of magnets and poles on the stator, the current through the stator coils, and the radial distance of the coils away from an axis of rotation of the rotor(s). In this way the number of poles, the physical size of the stator, and the coil current, more particularly current density is defined.

This can then lead to a choice in stator bar cross-sectional area/dimensions (each bar is effectively a solenoid). This in turn leads to a choice in the number of turns employed, and this is related to the cross-sectional area of the wire used via the wire resistance. It is generally desirable to maximise the wire thickness, more particularly the width w of the ribbon 524 of FIG. 5c, without the coils interfering with one another, and leaving sufficient gap between the coils for the coolant to flow. Broadly speaking the greater the dimension w the greater the current density and hence output torque. The oil gap depends upon the working temperature of the motor which in turn depends, inter alia, on the materials used for its construction; it is also affected by the flow rate of the coolant, the design temperature differential of the coolant, the nature of the flow (smooth or turbulent) and other factors. The skilled person will appreciate that there are many interacting factors to consider and that, in general, an iterative design procedure may be employed to determine any particular parameter, such as the width w of the wire ribbon 524. Nonetheless it can be appreciated that a large dimension w reduces resistance and increases current carrying capability for a given current density, but that this should be balanced against the amount of cooling needed.

Using edge-wound coils the gaps between the coils can be more accurately controlled facilitating the use of more efficient cooling techniques and in particular substantially reducing the 'weakest link' effect. Among other things, by using only a single layer of windings, with good tolerance, accurate gaps between the stator coils can be maintained which helps to equalize flow minimising hot spots in the stator. Furthermore because the gaps between adjacent coils can be reduced, the copper fill can be increased, reducing losses. Still further reducing the gaps between the coils enables a higher coolant flow rate to be created between the coils, thus increasing the heat transfer. In embodiments, in particular those with blocks/barriers as previously described, the coolant fluid may be forced past the coils through gaps as small as 1 mm. Overall, very substantial increases in power output can be obtained.

No doubt many other effective alternatives will occur to the skilled person. For example, although oil has been described as a coolant alternative coolants may also be employed, for example a coolant for a two-phase cooling system. It will be understood that the invention is not limited to the described embodiments and encompasses modifications apparent to those skilled in the art lying within the spirit and scope of the claims appended hereto.

The invention claimed is:

1. A method of manufacturing an axial flux permanent magnet machine, the machine having a stator comprising a stator housing enclosing a set of coils wound on respective stator bars and disposed circumferentially at intervals about an axis of the machine, and a rotor bearing a set of permanent magnets and mounted for rotation about said axis, and wherein said rotor and stator are spaced apart along said axis to define a gap between the rotor and stator in which magnetic flux in the machine is generally in an axial direction, the method comprising:

providing ports for flowing coolant through said stator housing around said coils such that said coolant flows between said coils;

defining a gap for coolant flow between adjacent said coils, wherein each of said coils includes a single layer of windings over said stator bar, said layer of windings comprising a ribbon-shaped wire having a greater width across a surface of the ribbon-shaped wire than thickness through the ribbon-shaped wire; wherein said windings are stacked horizontally along said stator bar such that inner edges of said coil abut said stator bar and each of the adjacent surfaces of said windings abut one another, wherein said width of said single layer of windings defines a distance across said coil perpendicular to a direction in which said windings are stacked, and wherein said gap for coolant flow is defined by outer edges of adjacent coils;

designing said machine by controlling said gap between said adjacent coils to within a tolerance limit using a tolerance of said width of said wire; and manufacturing said axial flux permanent magnet machine to the design.

2. A method as claimed in claim 1 wherein said controlling said gap between said coils comprises controlling a percentage variation from an average gap between said coils of said stator to within said tolerance limit by using said single layer of windings of said ribbon-shaped wire to limit variation in spacing between outer edges of said coils of said stator.

3. A method as claimed in claim 2 wherein a minimum value of said gap between said coils is less than 2 mm and wherein said tolerance limit is 20% of said gap.

4. A method as claimed in claim 1 further comprising providing said coils of said stator with a shoe at each end, and stopping said windings short of one or both said shoes to define a coolant channel between an end of said coil of said stator and a respective said shoe.

5. A method as claimed in claim 1 further comprising preloading each of said coils in compression to urge turns of each of said coils of said stator towards one another.

6. An axial flux permanent magnetic machine, the machine having a stator comprising:

a stator housing enclosing a set of coils wound on respective stator bars and disposed circumferentially at intervals about an axis of the machine, and a rotor bearing a set of permanent magnets and mounted for rotation about said axis, and wherein said rotor and stator are spaced apart along said axis to define a gap therebetween in which magnetic flux in the machine is generally in an axial direction;

wherein:
each of said coils includes a single layer of windings over said stator bar, said single layer of windings comprising a ribbon-shaped wire having a greater width across a surface of the ribbon-shaped wire than thickness through the ribbon, said windings are stacked horizontally along said stator bar such that inner edges of said coil abut said stator bar and adjacent surfaces of said windings abut one another, said width of said single layer of windings defines a distance across a said coil perpendicular to a direction in which said windings are stacked, outer edges of adjacent coils define a gap for coolant flow between said adjacent stator coils for cooling said machine; and said gap between said adjacent coils is controlled to within a tolerance limit that is using a tolerance of said width of said wire.

7. An axial flux permanent magnetic machine as claimed in 6 wherein each of said coils is preloaded in compression to urge turns of each of said coils towards one another.

8. An axial flux permanent magnetic machine as claimed in claim 6 wherein a respective one of said stator bars has a shoe at each end, and wherein a gap between said coil and said shoe defines, at one or both ends of said coil, a coolant channel.

9. An axial flux permanent magnetic machine as claimed in claim 8 further comprising a spacer between an end of said coil and the respective shoe to define said channel.

10. An axial flux permanent magnetic machine as claimed in claim 6 further comprising barriers or blocks between a subset of said coils of said stator and radially inner and outer walls of said housing to force flow of a coolant through said gaps between said coils of said stator.

11. An axial flux permanent magnetic machine as claimed in claim 10 wherein a respective one of said stator bars has a shoe at each end, wherein said shoes at each end of said stator bars contact a respective facing pocket of said stator housing; wherein said stator housing comprises coolant inlet and outlet ports, and wherein around said stator said barriers are provided alternately connecting a said coil of said stator to said inner wall and to said outer wall after intervals of a plurality of coils of said stator to define a first plurality of coolant flow channels between adjacent coils of said stator in a first radial direction and a second plurality of coolant flow channels between adjacent coils of said stator in a second, opposite radial direction; and wherein said defining of said distance across a said coil of said stator controls widths of said coolant flow channels in the same radial direction between adjacent said coils of said stator to balance coolant flows in said coolant flow channels in the same radial direction.

* * * * *